United States Patent
Xie et al.

(10) Patent No.: US 9,598,289 B2
(45) Date of Patent: Mar. 21, 2017

(54) MOLECULAR SIEVE SSZ-102

(71) Applicants: Dan Xie, Richmond, CA (US); Stacey Ian Zones, San Francisco, CA (US)

(72) Inventors: Dan Xie, Richmond, CA (US); Stacey Ian Zones, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 404 days.

(21) Appl. No.: 14/523,761

(22) Filed: Oct. 24, 2014

(65) Prior Publication Data
US 2016/0115037 A1   Apr. 28, 2016

(51) Int. Cl.
*C01B 39/48* (2006.01)
*B01J 29/70* (2006.01)
*B01J 20/18* (2006.01)

(52) U.S. Cl.
CPC ............ *C01B 39/48* (2013.01); *B01J 20/18* (2013.01); *B01J 29/70* (2013.01)

(58) Field of Classification Search
CPC .................................. C01B 39/48; B01J 29/70
See application file for complete search history.

(56) References Cited

U.S. PATENT DOCUMENTS

| | | | | |
|---|---|---|---|---|
| 4,952,384 A * | 8/1990 | Lok | .......................... | B01J 29/84 423/306 |
| 4,956,165 A * | 9/1990 | Lok | .......................... | B01J 29/84 423/306 |
| 6,350,429 B1 * | 2/2002 | Murrell | .................. | B01J 29/035 423/305 |
| 8,500,850 B2 * | 8/2013 | Carati | .................... | B01D 53/02 423/700 |
| 9,409,786 B2 * | 8/2016 | Xie | ........................ | C01B 39/305 |
| 9,416,017 B2 * | 8/2016 | Xie | ........................ | C01B 39/305 |
| 2014/0154174 A1 * | 6/2014 | Carati | .................... | B01D 53/02 423/706 |
| 2016/0115037 A1 * | 4/2016 | Xie | ........................ | C01B 39/48 423/718 |
| 2016/0115038 A1 * | 4/2016 | Xie | ........................ | C01B 39/48 423/704 |

FOREIGN PATENT DOCUMENTS

IT    1270630    5/1997

OTHER PUBLICATIONS

B.J. Campbell, G. Bellussi, L. Carluccio, G. Perego, A.K. Cheetham, D.E. Cox and R. Millini "The Synthesis of the New Zeolite, ERS-7, and the Determination of its Structure by Simulated Annealing and Synchrotron X-ray Powder Diffraction" Chem. Commun. 1998, 1725-1726.

R. Millini, G. Perego, L. Carluccio, G. Bellussi, D.E. Cox, B.J. Campbell and A.K. Cheetham "The Synthesis of Zeolite ERS-7 and its Structure Determination using Simulated Annealing and Synchrotron X-ray Powder Diffraction" Proc. 12th Int. Zeolite Conf. I 1999, 541-548.

B.J. Campbell, A.K. Cheetham, T. Vogt, L. Carluccio, W.O. Parker, C. Flego and R. Millini "The Determination of Brønsted Acid Sites in Zeolite ERS-7 by Neutron and X-ray Powder Diffraction" J. Phys. Chem. B 2001, 105, 1947-1955.

* cited by examiner

*Primary Examiner* — David M Brunsman
(74) *Attorney, Agent, or Firm* — Terrence M. Flaherty

(57) ABSTRACT

A new crystalline molecular sieve designated SSZ-102 having ESV framework topology is disclosed. SSZ-102 is synthesized using an N,N'-dimethyl-1,4-diazabicyclo[2.2.2] octane dication as a structure directing agent.

4 Claims, 3 Drawing Sheets

MOLECULAR SIEVE SSZ-102

TECHNICAL FIELD

This disclosure is directed to a new crystalline molecular sieve designated SSZ-102 having ESV framework topology, a method for preparing SSZ-102 using an N,N'-dimethyl-1,4-diazabicyclo[2.2.2]octane dication as a structure directing agent and uses for SSZ-102.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types*," Sixth Revised Edition, Elsevier, 2007.

ERS-7 is a single crystalline phase zeolite having a structure consisting of 17-sided ($4^6 5^4 6^5 8^2$) "picnic basket"-shaped cages connected by 8-membered ring windows with 4.7×3.5 Å free dimensions. The framework structure of ERS-7 has been assigned the three-letter code ESV by the Structure Commission of the International Zeolite Association.

Italian Patent No. 1270630 discloses zeolite ERS-7 and its synthesis using an N,N-dimethylpiperidinium cation as a structure directing agent. ERS-7 is reported to have a $SiO_2/Al_2O_3$ mole ratio between 15 and 30.

It has now been found that crystalline molecular sieves having ESV framework topology and having a $SiO_2/Al_2O_3$ mole ratio of from 5 to 12 can be prepared using an N,N'-dimethyl-1,4-diazabicyclo[2.2.2]octane cation as a structure directing agent.

SUMMARY

This disclosure is directed to a family of crystalline molecular sieves with unique properties, referred to herein as "molecular sieve SSZ-102" or simply "SSZ-102". SSZ-102 has the framework topology designated "ESV" by the International Zeolite Association.

In one aspect, there is provided a crystalline molecular sieve having ESV framework topology and having a $SiO_2/Al_2O_3$ mole ratio of from 5 to 12. Molecular sieve SSZ-102 has, in its calcined form, the X-ray diffraction lines of Table 4.

In another aspect, there is provided a method for preparing a crystalline molecular sieve having ESV framework topology by contacting under crystallization conditions: (1) at least one source of silicon; (2) at least one source of aluminum; (3) at least one source of an element selected from Groups 1 and 2 of the Periodic Table; (4) hydroxide ions; and (5) an N,N'-dimethyl-1,4-diazabicyclo[2.2.2]octane dication as a structure directing agent.

In yet another aspect, there is provided a process for preparing a molecular sieve having ESV framework topology by: (a) preparing a reaction mixture containing: (1) at least one source of silicon; (2) at least one source of aluminum; (3) at least one source of an element selected from Groups 1 and 2 of the Periodic Table; (4) hydroxide ions; (5) an N,N'-dimethyl-1,4-diazabicyclo[2.2.2]octane dication; and (6) water; and (b) subjecting the reaction mixture to crystallization conditions sufficient to form crystals of the molecular sieve.

In still yet another aspect, there is provided a crystalline molecular sieve having ESV framework topology and having a composition, as-synthesized and in its anhydrous state, in terms of mole ratios, as follows:

|  | Broad | Exemplary |
|---|---|---|
| $SiO_2/Al_2O_3$ | 5 to 12 | 5 to 10 |
| $Q/SiO_2$ | 0.015 to 0.15 | 0.04 to 0.10 |
| $M/SiO_2$ | 0.010 to 0.20 | 0.05 to 0.20 | wherein Q is an N,N'-dimethyl-1,4-diazabicyclo[2.2.2]octane dication and M is selected from the group consisting of elements from Groups 1 and 2 of the Periodic Table.

DETAILED DESCRIPTION

Reaction Mixture

Figure 1:
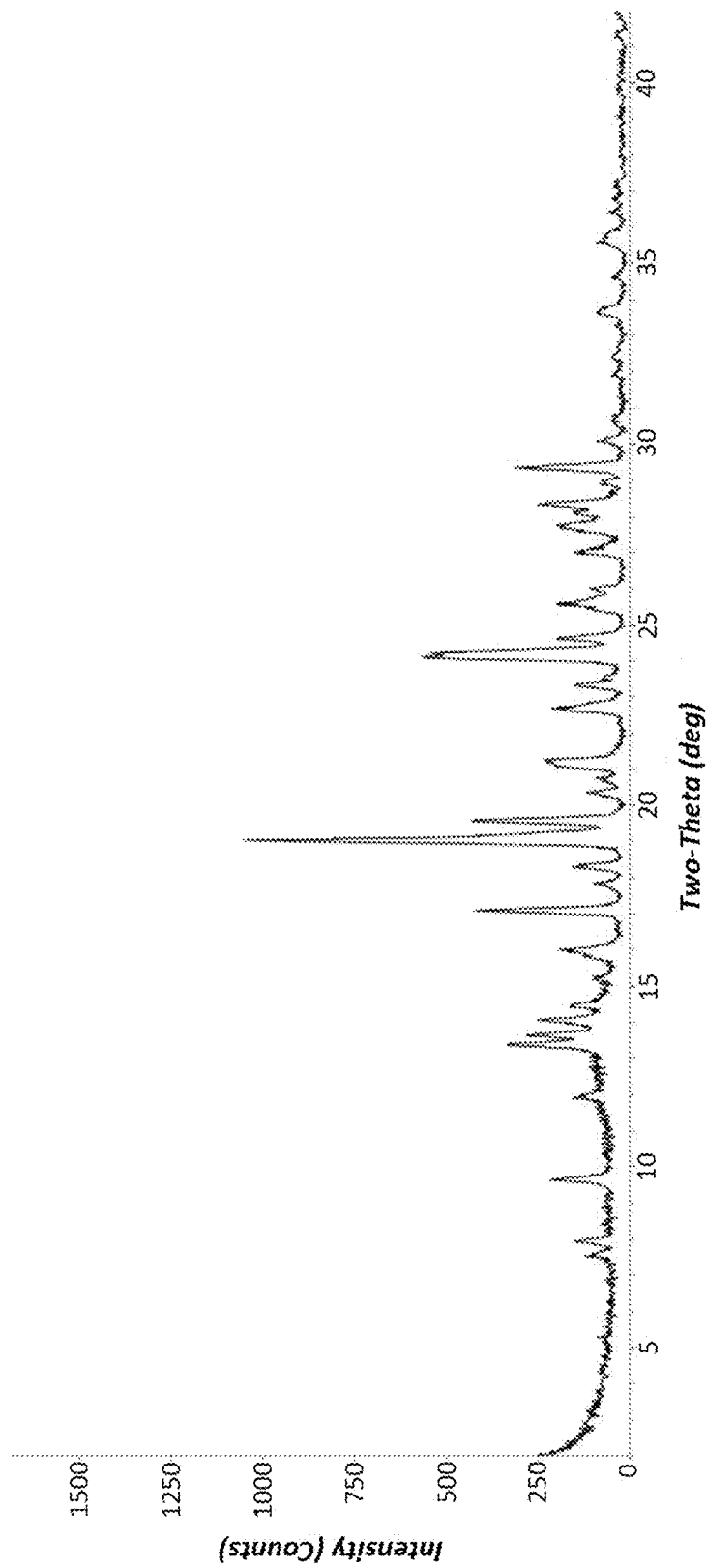
FIG. 1 is a powder X-ray diffraction (XRD) pattern of the as-synthesized molecular sieve prepared in Example 1.

In preparing SSZ-102, an N,N'-dimethyl-1,4-diazabicyclo[2.2.2]octane dication ("dimethyl DABCO dication") is used as a structure directing agent ("SDA"), also known as a crystallization template. The SDA useful for making the molecular sieve is represented by the following structure (1):

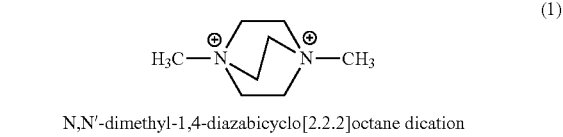

N,N'-dimethyl-1,4-diazabicyclo[2.2.2]octane dication

SDA dication is typically associated with anions which can be any anion which is not detrimental to the formation of the molecular sieve. Representative anions include elements from Group 17 of the Periodic Table (e.g., fluoride, chloride, bromide and iodide), hydroxide, sulfate, tetrafluoroborate, acetate, carboxylate, and the like. As used herein, the numbering scheme for the Periodic Table Groups is as described in *Chem. Eng. News* 63(5), 26-27 (1985).

In general, molecular sieve SSZ-102 is prepared by: (a) preparing a reaction mixture containing (1) at least one source of silicon; (2) at least one source of aluminum; (3) at least one source of an element selected from Groups 1 and 2 of the Periodic Table; (4) hydroxide ions; (5) an N,N'-dimethyl-1,4-diazabicyclo[2.2.2]octane dication; and (6) water; and (b) subjecting the reaction mixture to crystallization conditions sufficient to form crystals of the molecular sieve.

The composition of the reaction mixture from which the molecular sieve is formed, in terms of mole ratios, is identified in Table 1 below:

TABLE 1

| Reactants | Broad | Exemplary |
| --- | --- | --- |
| $SiO_2/Al_2O_3$ | 5 to 50 | 10 to 30 |
| $M/SiO_2$ | 0.10 to 1.00 | 0.40 to 0.90 |
| $Q/SiO_2$ | 0.05 to 0.50 | 0.15 to 0.35 |
| $OH/SiO_2$ | 0.10 to 1.20 | 0.70 to 1.20 |
| $H_2O/SiO_2$ | 10 to 70 | 15 to 35 | wherein compositional variables M and Q are as described herein above.

Sources useful herein for silicon include fumed silica, precipitated silicates, silica hydrogel, silicic acid, colloidal silica, tetra-alkyl orthosilicates (e.g., tetraethyl orthosilicate), and silica hydroxides.

Sources useful for aluminum include oxides, hydroxides, acetates, oxalates, ammonium salts and sulfates of aluminum. Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is zeolite Y.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post-Synthesis Treatment

In practice, molecular sieve SSZ-102 is prepared by: (a) preparing a reaction mixture as described herein above; and (b) subjecting the reaction mixture to crystallization conditions sufficient to form crystals of the molecular sieve.

The reaction mixture is maintained at an elevated temperature until the molecular sieve is formed. The hydrothermal crystallization is usually conducted under pressure and usually in an autoclave so that the reaction mixture is subject to autogenous pressure, at a temperature of from 125° C. to 200° C.

The reaction mixture can be subjected to mild stirring or agitation during the crystallization step. It will be understood by the skilled artisan that the molecular sieves described herein can contain impurities, such as amorphous materials, unit cells having framework topologies which do not coincide with the molecular sieve, and/or other impurities.

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting nucleation and/or formation of the molecular sieve over any undesired phases. When used as seeds, seed crystals are added in an amount of from 1 to 10 wt. % of the source of silicon used for the reaction mixture.

Once the molecular sieve has formed, the solid product is separated from the reaction mixture by standard mechanical techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA cation can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic matter from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange or other known method and replace it with hydrogen, ammonium, or any desired metal ion.

Where the molecular sieve formed is an intermediate material, the target molecular sieve can be achieved using post-synthesis techniques to allow for the synthesis of a target material having a higher Si/Al ratio from an intermediate material by acid leaching or other similar dealumination methods.

The molecular sieve made by the process described herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying or dried or partially dried and then extruded.

The molecular sieve can be composited with other materials resistant to the temperatures and other conditions employed organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the Molecular Sieve

Molecular sieves synthesized by the process described herein have a composition, as-synthesized and in its anhydrous state, as described in Table 2 (in terms of mole ratios):

TABLE 2

| | Broad | Exemplary |
| --- | --- | --- |
| $SiO_2/Al_2O_3$ | 5 to 12 | 5 to 10 |
| $Q/SiO_2$ | 0.015 to 0.15 | 0.04 to 0.10 |
| $M/SiO_2$ | 0.010 to 0.20 | 0.05 to 0.20 | wherein compositional variables Q and M are as described herein above.

Molecular sieves made by the process disclosed herein are characterized by their XRD pattern. The powder XRD pattern lines of Table 3 are representative of as-synthesized SSZ-102 made in accordance with this disclosure. Minor variations in the powder XRD pattern can result from variations in the mole ratios of the framework species of the particular sample due to changes in lattice constants. In addition, sufficiently small crystals will affect the shape and intensity of peaks, leading to significant peak broadening. Minor variations in the powder XRD pattern can also result from variations in the organic compound used in the preparation of the molecular sieve. Calcination can also cause minor shifts in the powder XRD pattern. Notwithstanding these minor pertubations, the basic crystal lattice structure remains unchanged.

TABLE 3

Characteristic Peaks for As-Synthesized SSZ-102

| 2-Theta[a] | d-Spacing, nm | Relative Intensity[b] |
|---|---|---|
| 7.53 | 1.173 | W |
| 7.93 | 1.115 | W |
| 9.64 | 0.916 | W |
| 11.91 | 0.743 | W |
| 13.38 | 0.661 | M |
| 13.64 | 0.649 | M |
| 14.06 | 0.630 | M |
| 14.46 | 0.612 | W |
| 15.27 | 0.580 | W |
| 15.82 | 0.560 | W |
| 16.00 | 0.554 | M |
| 17.08 | 0.519 | M |
| 17.87 | 0.496 | W |
| 18.30 | 0.484 | W |
| 19.04 | 0.466 | VS |
| 19.16 | 0.463 | M |
| 19.56 | 0.453 | S |
| 20.36 | 0.436 | W |
| 20.75 | 0.428 | W |
| 21.09 | 0.421 | M |
| 21.25 | 0.418 | M |

[a]±0.20 degrees
[b]The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

The X-ray diffraction lines of Table 4 are representative of calcined SSZ-102 made in accordance with this disclosure.

TABLE 4

Characteristic Peaks for Calcined SSZ-102

| 2-Theta[a] | d-Spacing, nm | Relative Intensity[b] |
|---|---|---|
| 7.60 | 1.162 | W |
| 8.01 | 1.103 | M |
| 9.74 | 0.908 | M |
| 12.02 | 0.736 | M |
| 13.44 | 0.658 | VS |
| 13.70 | 0.646 | VS |
| 14.11 | 0.627 | VS |
| 14.56 | 0.608 | W |
| 15.30 | 0.579 | W |
| 15.87 | 0.558 | W |
| 16.20 | 0.547 | W |
| 17.16 | 0.516 | W |
| 17.96 | 0.493 | W |
| 18.38 | 0.482 | W |
| 19.12 | 0.464 | VS |
| 19.31 | 0.459 | VS |
| 19.70 | 0.450 | S |
| 20.39 | 0.435 | W |
| 20.89 | 0.425 | W |
| 21.16 | 0.419 | M |
| 21.34 | 0.416 | M |

[a]±0.20 degrees
[b]The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

The powder XRD patterns presented herein were collected by standard techniques. The radiation was CuK$_\alpha$ radiation. The peak heights and the positions, as a function of 2θ where 2θ is the Bragg angle, were read from the relative intensities of the peaks, and d, the interplanar spacing corresponding to the recorded lines, can be calculated.

Processes Using SSZ-102

SSZ-102 is useful as an adsorbent for gas separations. SSZ-102 can also be used as a catalyst for converting oxygenates (e.g., methanol) to olefins and for making small amines. SSZ-102 can be used to reduce oxides of nitrogen in a gas streams, such as automobile exhaust. SSZ-102 can also be used to as a cold start hydrocarbon trap in combustion engine pollution control systems. SSZ-102 is particularly useful for trapping $C_3$ fragments.

EXAMPLES

The following illustrative examples are intended to be non-limiting.

Example 1

0.45 g of a 50% NaOH solution, 2.28 g of deionized water, and 0.50 g of CBV720 Y-zeolite powder (Zeolyst International, $SiO_2/Al_2O_3$ mole ratio=30) were mixed together in a Teflon liner. Then, 1.08 g of a 19% dimethyl DABCO hydroxide solution was added to the mixture. The Teflon liner was then capped and placed within a steel Parr autoclave. The autoclave was placed on a spit within a convection oven and heated at 135° C. for 4 days. The autoclave was removed and allowed to cool to room temperature. The solids were then recovered by filtration, washed thoroughly with deionized water and dried at 95° C.

Figure 2:
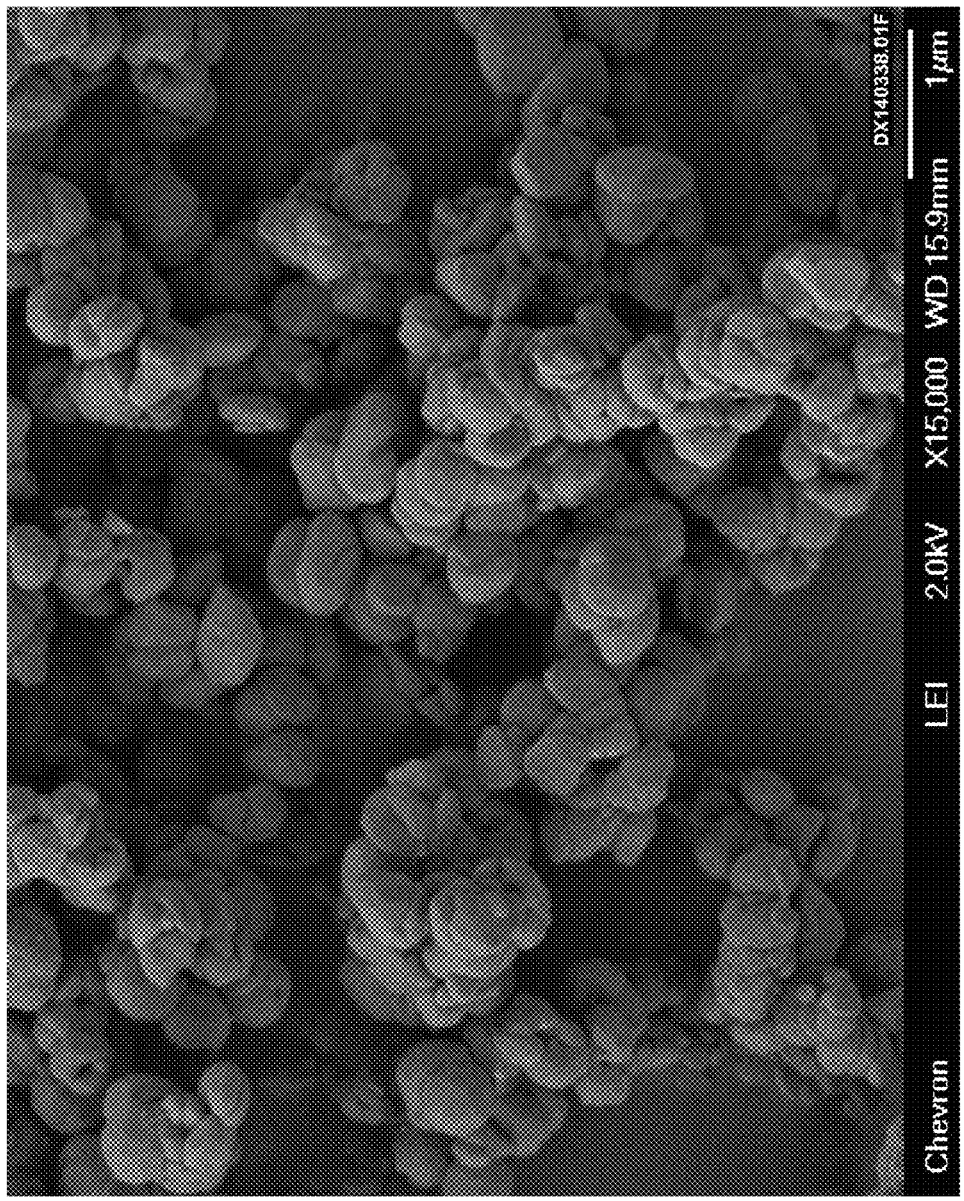
FIG. 2 is a Scanning Electron Micrograph (SEM) image of the as-synthesized molecular sieve prepared in Example 1.

The resulting molecular sieve product was analyzed by powder XRD and SEM. The resulting powder XRD pattern is shown in FIG. 1 and indicates that the product is a pure ESV framework type molecular sieve. FIG. 2 is a SEM image of the product and shows a uniform field of crystals.

The product had a $SiO_2/Al_2O_3$ mole ratio of 7.67, as determined by ICP elemental analysis.

Example 2

0.87 g of a 50% NaOH solution, 6.87 g of deionized water, and 1.00 g of CBV720 Y-zeolite powder (Zeolyst International, $SiO_2/Al_2O_3$ mole ratio=30) were mixed together in a Teflon liner. Then, 2.18 g of a 19% dimethyl DABCO hydroxide solution was added to the mixture. The Teflon liner was then capped and placed within a steel Parr autoclave. The autoclave was placed on a spit within a convection oven and heated at 150° C. for 4 days. The autoclave was removed and allowed to cool to room temperature. The solids were then recovered by filtration, washed thoroughly with deionized water and dried at 95° C.

The product of this preparation was identified by powder XRD analysis as a pure ESV framework type molecular sieve.

The product had a $SiO_2/Al_2O_3$ mole ratio of 8.74, as determined by ICP elemental analysis.

Example 3

0.50 g of a 50% NaOH solution, 4.50 g of deionized water, and 0.50 g of CBV720 Y-zeolite powder (Zeolyst International, $SiO_2/Al_2O_3$ mole ratio=30) were mixed together in a Teflon liner. Then, 1.10 g of a 19% dimethyl DABCO hydroxide solution was added to the mixture. The Teflon liner was then capped and placed within a steel Parr autoclave. The autoclave was placed on a spit within a convection oven and heated at 135° C. for 4 days. The autoclave was removed and allowed to cool to room temperature. The solids were then recovered by filtration, washed thoroughly with deionized water and dried at 95° C.

The product of this preparation was identified by powder XRD analysis as a pure ESV framework type molecular sieve.

The product had a $SiO_2/Al_2O_3$ mole ratio of 8.21, as determined by ICP elemental analysis.

Example 4

0.40 g of a 50% NaOH solution, 1.05 g of deionized water, and 0.51 g of CBV720 Y-zeolite powder (Zeolyst International, $SiO_2/Al_2O_3$ mole ratio=30) were mixed together in a Teflon liner. Then, 1.09 g of a 19% dimethyl DABCO hydroxide solution was added to the mixture. The Teflon liner was then capped and placed within a steel Parr autoclave. The autoclave was placed on a spit within a convection oven and heated at 135° C. for 4 days. The autoclave was removed and allowed to cool to room temperature. The solids were then recovered by filtration, washed thoroughly with deionized water and dried at 95° C.

The product of this preparation was identified by powder XRD analysis as a pure ESV framework type molecular sieve.

The product had a $SiO_2/Al_2O_3$ mole ratio of 8.03, as determined by ICP elemental analysis.

Example 5

0.51 g of a 50% NaOH solution, 2.25 g of deionized water, and 0.50 g of CBV720 Y-zeolite powder (Zeolyst International, $SiO_2/Al_2O_3$ mole ratio=30) were mixed together in a Teflon liner. Then, 1.09 g of a 19% dimethyl DABCO hydroxide solution was added to the mixture. The Teflon liner was then capped and placed within a steel Parr autoclave. The autoclave was placed on a spit within a convection oven and heated at 135° C. for 4 days. The autoclave was removed and allowed to cool to room temperature. The solids were then recovered by filtration, washed thoroughly with deionized water and dried at 95° C.

The product of this preparation was identified by powder XRD analysis as a mixture of ESV framework type molecular sieve and a small portion of ANA framework type molecular sieve.

Example 6

1.90 g of a 50% NaOH solution, 5.14 g of deionized water, and 5.00 g of LZ-210 Y-zeolite powder ($SiO_2/Al_2O_3$ mole ratio=13) were mixed together in a Teflon liner. Then, 14.89 g of a 19% dimethyl DABCO hydroxide solution was added to the mixture. Finally, 6.11 g of a 38.5% sodium silicate solution was added to the mixture and the gel was stirred until it became homogeneous. The Teflon liner was then capped and placed within a steel Parr autoclave. The autoclave was placed on a spit within a convection oven and heated at 150° C. for 6 days. The autoclave was removed and allowed to cool to room temperature. The solids were then recovered by filtration, washed thoroughly with deionized water and dried at 95° C.

The product of this preparation was identified by powder XRD analysis as a mixture of ESV framework type molecular sieve and ANA framework type molecular sieve.

Example 7

0.38 g of a 50% NaOH solution, 2.02 g of deionized water, and 0.51 g of CBV720 Y-zeolite powder (Zeolyst International, $SiO_2/Al_2O_3$ mole ratio=30) were mixed together in a Teflon liner. Then, 1.45 g of a 19% dimethyl DABCO hydroxide solution was added to the mixture. The Teflon liner was then capped and placed within a steel Parr autoclave. The autoclave was placed on a spit within a convection oven and heated at 135° C. for 4 days. The autoclave was removed and allowed to cool to room temperature. The solids were then recovered by filtration, washed thoroughly with deionized water and dried at 95° C.

The product of this preparation was identified by powder XRD analysis as a mixture of ESV framework type molecular sieve and a small portion of LEV framework type molecular sieve.

Example 8

2.39 g of a 50% NaOH solution, 6.78 g of deionized water, and 4.00 g of LZ-210 Y-zeolite powder ($SiO_2/Al_2O_3$ mole ratio=13) were mixed together in a Teflon liner. Then, 11.17 g of a 19% dimethyl DABCO hydroxide solution was added to the mixture. Finally, 8.37 g of a 38.5% sodium silicate solution was added to the mixture and the gel was stirred until it became homogeneous. The Teflon liner was then capped and placed within a steel Parr autoclave. The autoclave was placed on a spit within a convection oven and heated at 150° C. for 7 days. The autoclave was removed and allowed to cool to room temperature. The solids were then recovered by filtration, washed thoroughly with deionized water and dried at 95° C.

The product of this preparation was identified by powder XRD analysis as a mixture of ESV framework type molecular sieve and LEV framework type molecular sieve.

Example 9

1.45 g of a 50% NaOH solution, 2.46 g of deionized water, and 0.49 g of a 50% aluminum hydroxide solution (Barcroft™ USP 0250) were mixed together in a Teflon liner. Then, 5.55 g of a 19% dimethyl DABCO hydroxide solution was added to the mixture. Finally, 6.00 g of colloidal silica (LUDOX® AS-40) was added to the mixture and the gel was stirred until it became homogeneous. The Teflon liner was then capped and placed within a steel Parr autoclave. The autoclave was placed on a spit within a convection oven and heated at 170° C. for 7 days. The autoclave was removed and allowed to cool to room temperature. The solids were then recovered by filtration, washed thoroughly with deionized water and dried at 95° C.

The product of this preparation was identified by powder XRD analysis as a mixture of ESV framework type molecular sieve, ANA framework type molecular sieve and MOR framework type molecular sieve.

Example 10

Calcination of SSZ-102

The as-synthesized molecular sieve product of Example 1 was calcined inside a muffle furnace under a flow of air heated to 540° C. at a rate of 1° C./minute and held at 540° C. for 5 hours, cooled and then analyzed by powder XRD.

Figure 3:
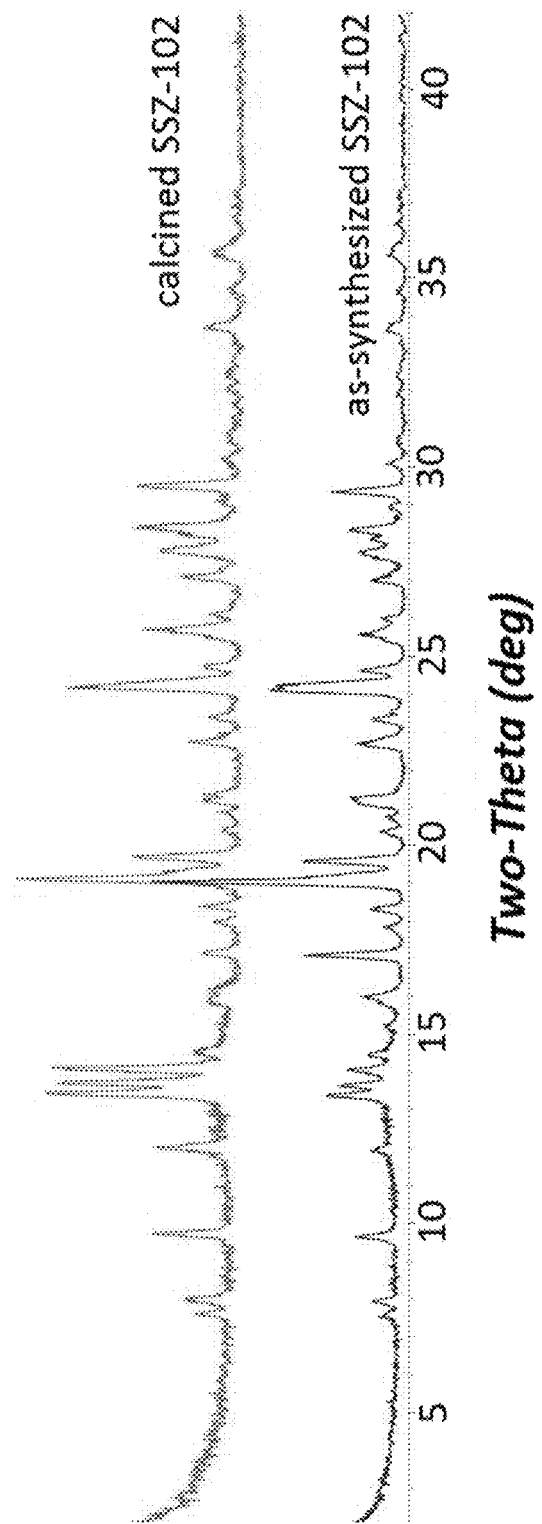
FIG. 3 shows a comparison of two X-ray diffraction patterns, the top one being calcined SSZ-102 as prepared in Example 10 and the bottom one being as-synthesized SSZ-102 as prepared in Example 1.

FIG. 3 shows a comparison of two X-ray diffraction patterns, the top one being calcined SSZ-102 as prepared in Example 10 and the bottom one being as-synthesized SSZ-102 as prepared in Example 1. The powder XRD pattern indicates that the material remains stable after calcination to remove the organic SDA.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A crystalline molecular sieve having ESV framework topology and having a $SiO_2/Al_2O_3$ mole ratio of from 5 to 12, wherein the molecular sieve has, in its calcined form, an X-ray diffraction pattern substantially as shown in the following table:

| 2-Theta | d-Spacing, nm | Relative Intensity |
|---|---|---|
| 7.60 ± 0.20 | 1.162 | W |
| 8.01 ± 0.20 | 1.103 | M |
| 9.74 ± 0.20 | 0.908 | M |
| 12.02 ± 0.20 | 0.736 | M |
| 13.44 ± 0.20 | 0.658 | VS |
| 13.70 ± 0.20 | 0.646 | VS |
| 14.11 ± 0.20 | 0.627 | VS |
| 14.56 ± 0.20 | 0.608 | W |
| 15.30 ± 0.20 | 0.579 | W |
| 15.87 ± 0.20 | 0.558 | W |
| 16.20 ± 0.20 | 0.547 | W |
| 17.16 ± 0.20 | 0.516 | W |
| 17.96 ± 0.20 | 0.493 | W |
| 18.38 ± 0.20 | 0.482 | W |
| 19.12 ± 0.20 | 0.464 | VS |
| 19.31 ± 0.20 | 0.459 | VS |
| 19.70 ± 0.20 | 0.450 | S |
| 20.39 ± 0.20 | 0.435 | W |
| 20.89 ± 0.20 | 0.425 | W |
| 21.16 ± 0.20 | 0.419 | M |
| 21.34 ± 0.20 | 0.416 | M. |

2. The molecular sieve of claim 1, wherein the molecular sieve has a $SiO_2/Al_2O_3$ mole ratio of from 5 to 10.

3. A crystalline molecular sieve having ESV framework topology and having a composition, as-synthesized and in its anhydrous state, in terms of mole ratios, as follows:

| | |
|---|---|
| $SiO_2/Al_2O_3$ | 5 to 12 |
| $Q/SiO_2$ | 0.015 to 0.15 |
| $M/SiO_2$ | 0.010 to 0.20 | wherein Q is an N,N'-dimethyl-1,4-diazabicyclo[2.2.2]octane dication and M is selected from the group consisting of elements from Groups 1 and 2 of the Periodic Table.

4. The molecular sieve of claim 3, wherein the molecular sieve has a composition, as-synthesized and in its anhydrous state, in terms of mole ratios, as follows:

| | |
|---|---|
| $SiO_2/Al_2O_3$ | 5 to 10 |
| $Q/SiO_2$ | 0.04 to 0.10 |
| $M/SiO_2$ | 0.05 to 0.20. |

* * * * *